Nov. 18, 1969 D. L. BAHRS ET AL 3,479,649

DATA PROCESSING SYSTEM INCLUDING MEANS FOR MASKING PROGRAM INTERRUPT REQUESTS

Filed July 22, 1966

INVENTORS
JOHN F. COULEUR
DAVID L. BAHRS

BY

William C. Cahill
Donald E. Kemmer
Ronald W. O'Keefe

ATTORNEYS

United States Patent Office 3,479,649

Patented Nov. 18, 1969

3,479,649

DATA PROCESSING SYSTEM INCLUDING MEANS FOR MASKING PROGRAM INTERRUPT REQUESTS

David L. Bahrs, Liverpool, N.Y., and John F. Couleur, Phoenix, Ariz., assignors to General Electric Company, a corporation of New York Filed July 22, 1966, Ser. No. 567,222

Int. Cl. G06f *13/00, 15/16*

U.S. Cl. 340—172.5 9 Claims

ABSTRACT OF THE DISCLOSURE

A data processing system including a plurality of subsystems, each connected for intercommunication exclusively through a memory controller. The subsystems include input/output devices or controllers, memory, and the data processor. The processor, when performing operations under the control of a program, may be interrupted through the receipt of a program interrupt request signal from the memory controller. The memory controller includes a plurality of interrupt cells, each having a corresponding mask and each receptive to an interrupt request from a subsystem connected to the memory controller. The interrupt cells store the existence of a program interrupt request and are arranged in a predetermined priority which will be altered in accordance with the condition of corresponding masking flip-flop.

The present invention pertains to data processing systems, and more specifically, to data processing systems wherein a program being executed may be interrupted to permit the system to perform a higher priority task, and wherein provision is made to ignore program interrupt requests generated under certain conditions.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily having much lower operating speed than the remainder of the data processing system, the input/output controller provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, an input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and may also provide a means for awarding priority when accesses to memory are requested by more than one subsystem.

In systems utilizing plural processors, unique advantages are gained through the use of plural memory controllers. Each of the memory controllers is connected to a different memory device and is also connected to one or more input/output controllers. The transfer of data and instructions throughout the system is facilitated and expedited by the memory controllers through the appropriate awarding of priority and control of access to memory. The multiple memory controllers also individually control communication among the subsystems connected thereto; since the memory controllers may share connection to several subsystems, intercommunication becomes possible. The configuration utilizing multiple data proccessors and memory controllers effectively yields overlapping data processing systems wherein each system is semi-autonomous and each may execute independent programs. Each input/output controller is provided with means for selecting a particular memory controller as its main memory controller; similarly, each memory controller includes a means for selecting a particular data processor as the control processor. By thus appropriately selecting the various subsystems each system of the overlapping systems is chosen to permit the recognition of communication among the subsystems as communication from within the same data processing system.

When in the process of executing a program, and a condition arises requiring immediate attention, provision may be made for a subsystem to generate a program interrupt signal. The present invention includes means for generating a program interrupt signal for servicing a subsystem without waiting for the execution of the program in process. The program interrup technique employed by the present system permits the interruption of a program under the control of an executive program to prevent interruption unless predetermined requirements for the interrupt are present. Further, since it is possible for more than one subsystem to generate a program interrupt signal, it is therefore possible for the program interrupt signals to substantially simultaneously occur thereby giving rise to conflicting requirements of the various subsystems. To alleviate the problems arising through the simultaneous generation of program signals, the present system permits program interrupts to be executed in accordance with a priority arrangement to thereby first service more urgent requests.

The response to a program interrupt may result in the branching from the program in process to a predetermined subroutine or perhaps an iterative procedure; however, the present system provides flexibility by permitting the response of the system to a program signal to be altered by the system prior to receiving the program interrupt. The response to the program interrupt signal may then take the form of a branch from the presently serviced program to an instruction that may be changed in accordance with an executive program for the system.

When program interrupts are requested by several subsystems, and a priority arrangement is provided to first service the more needy subsystems, specific program requirements may dictate the need for a priority rearrangement; more specifically, a program being executed and having a normally low priority may, under certain circumstances, reach a condition where the priority of the program or subsystem should be placed above all other programs or subsystems. To achieve this flexibility, the present system provides a means for a controlling data processor to override a priority arrangement previously arranged in the memory controller or controllers. Through the generation of mask signals, certain program interrupt signals of predetermined priority will be ignored in favor of a program interrupt signal of lower priority. The masking and unmasking of program priority arrangements readily permits the most efficient utilization of both software and hardware and provides the means for increasing the efficiency of the system under the control of an executive program.

It is therefore an object of the present invention to provide a data processing system having a changeable priority awarding means for altering the priority of program interrupt requests.

It is another object of the present invention to provide a data processing system wherein a memory controller receives program interrupt requests and stores the requests pending acknowledgement and servicing of the request by the remainder of the system.

It is another object of the present invention to provide a data processing system wherein a memory controller receives and stores indications of program interrupt requests and wherein the receipt of program interrupt requests will be acknowledged in accordance with a predetermined and alterable priority.

It is a further object to provide a data processing system wherein the memory controller receives and temporarily stores indications of program interrupt requests and wherein a control data processor may mask selected ones of the program interrupt requests to thereby inhibit acknowledgement of the request by the memory controller.

These and other objects of the present invention will become apparent to those skilled in the art as the description proceeds.

"Certain portions of the apparatus herein disclosed are not of our invention, but are the inventions of:

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleour, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
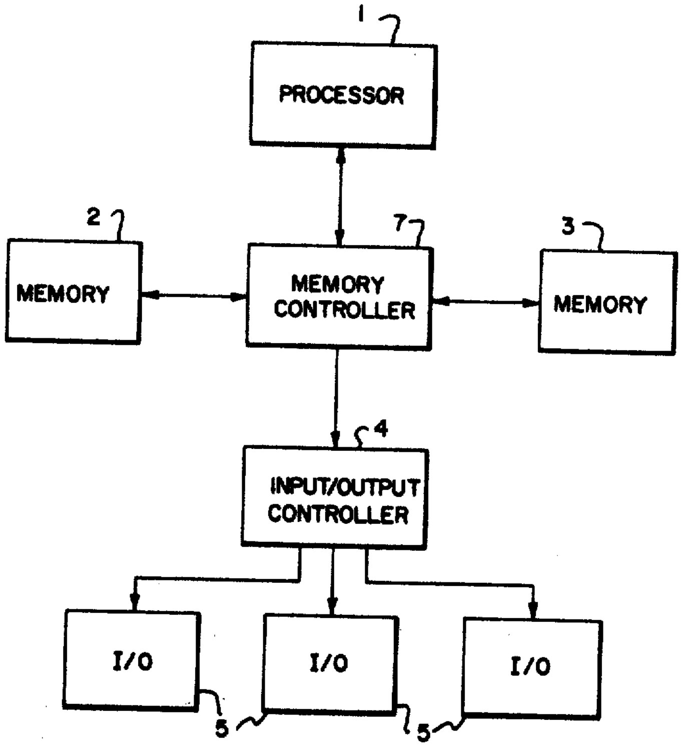
FIGURE 1 is a block diagram of a data processing system in a single memory controller configuration.

For a complete description of the system of FIGURE 1 and of my invention, reference is made to U.S. Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42 inclusive of U.S. Patent No. 3,413,613 which are incorporated herein by reference and made a part hereof.

What is claimed is:

1. In a data processing system the improvement comprising: a memory device for storing data and instructions; a plurality of communicating devices including a data processor for manipulating data in accordance with the instructions of a program, said communicating devices including means for generating interrupt signals in response to predetermined conditions; a memory controller connected to said memory device and to said communicating devices responsive to the generation of said interrupt signals for providing an interrupt present signal to said data processor, said memory controller including means for inhibiting the generation of said interrupt present signal when said interrupt signals are generated in response to selected ones of said predetermined conditions.

2. In a data processing system the improvement comprising: a memory device for storing data and instructions; a plurality of communicating devices including a data processor for manipulating data in accordance with the instructions of a program and including an input/output controller for transmitting and receiving data to and from input/output devices, said communicating devices including means for generating interrupt signals in response to predetermined conditions; a memory controller connected to said memory device and to said communicating devices responsive to the generation of said interrupt signals for providing an interrupt present signal to said data processor, said memory controller including means for inhibiting the generation of said interrupt present signal when said interrupt signals are generated in response to selected ones of said predetermined conditions.

3. In a data processing system the improvement comprising: a memory device for storing data and instructions; a plurality of communicating devices including a data processor for manipulating data in accordance with the instructions of a program, said communicating devices including means for generating interupt signals in response to predetermined conditions; a memory controller connected to said memory device and to said communicating devices responsive to the generation of said interrupt signals for storing an indication of the receipt of said interrupt signals and for providing an interrupt present signal to said data processor, said memory controller including means for inhibiting the generation of said interrupt present signal when said interrupt signals are generated in response to selected ones of said predetermined conditions.

4. In a data processing system the improvement comprising: a memory device for storing data and instructions; a plurality of communicating devices including a data processor for manipulating data in accordance with the instructions of a program, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for providing an interrupt present signal to said data processor, said memory controller including means responsive to said interrupt mask signals for inhibiting the generation of said interrupt present signal when said interupt signals are generated in response to selected ones of said predetermined conditions.

5. In a data processing system the improvement comprising: a memory device for storing data and instructions; a plurality of communicating devices including a data processor for minipulating data in accordance with the instructions of a program and including and input/output controller for transmitting and receiving data to and from input/output devices, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for providing an interrupt present signal to said data processor, said memory controller including means responsive to said interrupt mask signals for inhibiting the generation of said interrupt present signal when said interrupt signals are generated in response to selected ones of said predetermined conditions.

6. In a data processing system the improvement comprising: a memory device for storing data and instructions; a plurality of communicating devices including a data processor for manipulating data in accordance with the instructions of a program and including an input/output controller for transmitting and receiving data to and from input/output devices, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for storing an indication of the receipt of said interrupt signals and for providing an interrupt present signal to said data processor, said memory controller including means responsive to said interrupt mask signals for inhibiting the generation of said interrupt present signal when said interrupt signals are generated in response to selected ones of said predetermined conditions.

7. In a data processing system the improvement comprising: a memory device for storing data and instructions at addressable locations; a plurality of communicating devices including a data processor for manipulating data in accordance with the instructions of a program, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for providing a portion of an address to said data processor, said portion of an address including a bit configuration unique to the condition giving rise to the generation of the interrupt signals, said memoy controller also responsive to the generation of said interrupt signals for providing an interrupt present signal to said data processor, said memory controller including means responsive to said interrupt mask signals for inhibiting the generation of said interrupt present signal and the presentation of said portion of an address when said interrupt signals are generated in response to selected ones of said predetermined conditions.

8. In a data processing system the improvement comprising: a memory device for storing data and instructions at addressable locations; a plurality of communicating devices including a data processor for manipulating data in accordance with the intructions of a program and including an input/output controller for transmitting and receiving data to and from input/output devices, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for providing a portion of an address to said data processor, said portion of an address including a bit configuration unique to the condition giving rise to the generation of the interrupt signals, said memory controller also responsive to the generation of said interrupt signals for providing an interrupt present signal to said data processor, said memory controller including means responsive to said interrupt mask signals for inhibiting the generation of said interrupt present signal and the presentation of said portion of an address when said interrupt signals are generated in response to selected ones of said predetermined conditions.

9. In a data processing system the improvement comprising: a memory device for storing data and instructions at addressable locations; a plurality of communicating devices including a data processor for manipulating data in accordance with the instructions of a program and including an input/output controller for transmitting and receiving data to and from input/output devices, said communicating devices including means for generating interrupt signals in response to predetermined conditions, said data processor also including means for generating interrupt mask signals corresponding to selected ones of said predetermined conditions; a memory controller connected to said memory device and to said communicating devices responsive to the generation of said interrupt signals for providing a portion of an address to said data processor, said portion of an address including a bit configuration unique to the condition giving rise to the generation of the interrupt signals, said memory controller also responsive to the generation of said interrupt signals for storing an indication of the receipt of said interrupt signals and for providing an interrupt present signal to said data processor, said memory controller including means responsive to said interrupt mask signals for inhibiting the generation of said interrupt present signal and the presentation of said portion of an address when said interrupt signals are generated in response to selected ones of said predetermined conditions.

References Cited

UNITED STATES PATENTS

| | | | |
|---|---|---|---|
| 3,222,647 | 12/1965 | Strachey | 340—172.5 |
| 3,290,658 | 12/1966 | Callahan et al. | 340—172.5 |
| 3,319,226 | 5/1967 | Mott et al. | 340—172.5 |
| 3,323,110 | 5/1967 | Oliari et al. | 340—172.5 |
| 3,343,140 | 9/1967 | Richmond et al. | 340—172.5 |

GARETH D. SHAW, Primary Examiner